(12) United States Patent
White et al.

(10) Patent No.: US 10,686,702 B2
(45) Date of Patent: Jun. 16, 2020

(54) PREEMPTIVE CACHING OF CONTENT IN A CONTENT-CENTRIC NETWORK

(71) Applicant: Cable Television Laboratories, Inc., Louisville, CO (US)

(72) Inventors: Greg White, Louisville, CO (US); Greg Rutz, Arvada, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 598 days.

(21) Appl. No.: 15/345,333

(22) Filed: Nov. 7, 2016

(65) Prior Publication Data

US 2017/0134276 A1    May 11, 2017

Related U.S. Application Data

(60) Provisional application No. 62/252,138, filed on Nov. 6, 2015, provisional application No. 62/418,537, filed on Nov. 7, 2016.

(51) Int. Cl.
| | |
|---|---|
| *H04L 12/00* | (2006.01) |
| *H04L 12/747* | (2013.01) |
| *H04L 12/743* | (2013.01) |
| *G06F 12/0862* | (2016.01) |
| *H04L 29/08* | (2006.01) |

(52) U.S. Cl.
CPC ........ *H04L 45/742* (2013.01); *G06F 12/0862* (2013.01); *H04L 45/7457* (2013.01); *H04L 67/2847* (2013.01); *H04L 67/327* (2013.01); *G06F 2212/154* (2013.01)

(58) Field of Classification Search
CPC . H04L 67/104; H04L 45/742; H04L 45/7457; G06F 12/0862
USPC .......................................... 709/219, 229, 214
See application file for complete search history.

(56) References Cited

U.S. PATENT DOCUMENTS

| | | | | |
|---|---|---|---|---|
| 8,386,622 | B2 * | 2/2013 | Jacobson | .............. H04L 67/104 |
| | | | | 709/219 |
| 8,694,675 | B2 * | 4/2014 | Wang | .................... H04L 67/327 |
| | | | | 709/206 |
| 9,185,120 | B2 * | 11/2015 | Mahadevan | ........ H04L 63/1408 |
| 9,203,885 | B2 * | 12/2015 | Mosko | .................. H04L 63/164 |
| 9,379,970 | B2 * | 6/2016 | Wang | .................. H04L 63/0272 |
| 9,661,098 | B2 * | 5/2017 | Kim | ..................... H04L 67/2857 |
| 9,678,998 | B2 * | 6/2017 | Sevilla | ..................... G06F 16/22 |
| 2009/0287835 | A1 * | 11/2009 | Jacobson | .............. H04L 67/104 |
| | | | | 709/229 |

(Continued)

OTHER PUBLICATIONS

CCNx Semantics, draft-irtf-icnrg-ccnxsemantics-03, ICNRG M. Mosko, I. Solis, LinkedIn, C. Wood, PARC, Inc., Jun. 28, 2016.

(Continued)

*Primary Examiner* — Frantz Coby
(74) *Attorney, Agent, or Firm* — Great Lakes Intellectual Property, PLLC (57) ABSTRACT

Preemptive caching within content/name/information centric networking environment is contemplated. The preemptively caching may be performed within content/name/information centric networking environments of the type having a branching structure or other architecture sufficient to facilitate routing data, content, etc. such that one or more nodes other than a node soliciting a content object also receive the content object.

20 Claims, 4 Drawing Sheets

(56) References Cited

U.S. PATENT DOCUMENTS

| | | | |
|---|---|---|---|
| 2012/0076052 A1* | 3/2012 | Kling | H04L 41/12 370/256 |
| 2013/0018937 A1 | 1/2013 | Kim | |
| 2014/0164552 A1* | 6/2014 | Kim | H04L 67/2842 709/214 |
| 2016/0142510 A1* | 5/2016 | Westphal | H04L 67/322 709/219 |
| 2016/0156714 A1 | 6/2016 | Farhadi | |
| 2016/0173604 A1* | 6/2016 | Panigrahi | H04L 67/1097 709/216 |

OTHER PUBLICATIONS

CCN 1.0 Protocol Architecture, Marc Mosko, Ignacio Solis, Ersin Uzun, Palo Alto Research Center.

\* cited by examiner

PREEMPTIVE CACHING OF CONTENT IN A CONTENT-CENTRIC NETWORK

CROSS-REFERENCE TO RELATED APPLICATIONS

This application claims the benefit of U.S. provisional Application No. 62/252,138 filed Nov. 6, 2015 and the benefit of U.S. provisional Application No. 62/418,537 filed Nov. 7, 2016, the disclosures of which are incorporated in their entireties by reference herein.

TECHNICAL FIELD

The present invention relates to content/name/information centric networking, such as but not necessary limited to content/name/information centric networking of the type utilizing a response and request protocol to route data, content, etc. according to globally unique names associated therewith.

BACKGROUND

Information Centric Networking is an emerging networking approach that aims to address many of the shortcomings inherent in the Internet Protocol, particularly in current networks and in the networks envisioned in the future. One specific approach to Information Centric Networking, also known as Content-Centric Networking (CCN) and/or Named Data Networking (NDN), appears to be gaining mindshare in the research community and in industry, and promises to significantly improve network scalability, performance, and reduce cost over a network built on the Internet Protocol (IP). CCN/NDN provides native and elegant support for client mobility, multipath connectivity, multicast delivery and in-network caching; many of which are critical for current and future networks, and all of which require inefficient and/or complex managed overlays when implemented in IP. Further, CCN/NDN provides a much richer addressing framework than that existing in IP, which could eliminate significant sources of routing complexity.

As HTTP/IP is baked into the networking field (equipment, software stacks, applications, services, engineering knowledge, business models, even national policies), it may seem daunting to consider the use of a non-IP protocol. However, while IP has been a phenomenally successful networking protocol for the last 40 years, as technology and time progress it is reasonable to believe that we won't be utilizing it forever. One non-limiting aspect of the present invention contemplates employing preemptive caching in CCN/NDN to provide a much and potentially more optimal alternative to the Content Distribution Network (CDN) paradigm that has been built to support HTTP/IP content distribution.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
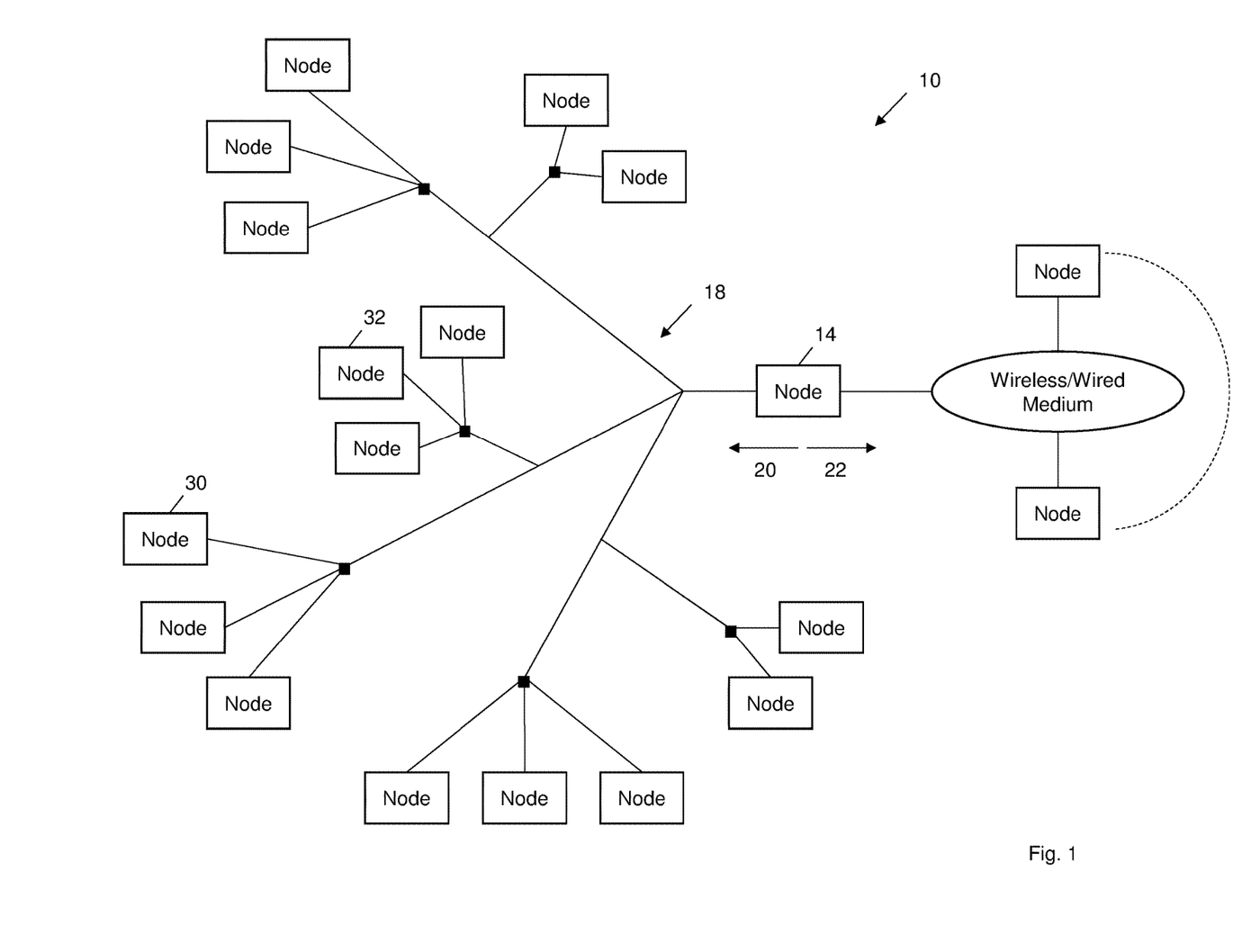
FIG. 1 illustrates a network in accordance with one non-limiting aspect of the present invention.

FIG. 1 illustrates a network 10 in accordance with one non-limiting aspect of the present invention. The network 10 may be configured to operate according to any suitable response and request protocol whereby content, data, objects, files, information, signaling, messages, etc. may be routed according to globally unique names associated therewith. The network 10 may correspond with the above-described name-data network (NDN) or information-centric network (ICN) and is predominately described for exemplary non-limiting purposes with respect to being operational as a content-centric network (CCN). The CCN may be configured to operate in a manner commensurate with the processes, messaging and other operations described within CCNx Semantics (draft-irtf-icnrg-ccnxsemantics-03) as published by The Internet Engineering Task Force (IETF), Jun. 28, 2016, and/or CCN 1.0 Protocol Architecture as published by Marc Mosko, Ignacio Solis, Ersin Uzun of the Palo Alto Research Center, the disclosures of which are hereby incorporated by reference in their entireties herein. The CCN 10 is shown to include a plurality of nodes configured to facilitate forwarding messages for clients (not shown) connected thereto or otherwise associated therewith, e.g., each node may be configured to facilitate routing, forwarding, relaying, processing or otherwise exchanging upstream and downstream signaling for one or more clients associated therewith.

The CCN 10 is shown to include a wired, wireless and/or combined wireless and wired medium to facilitate communications between a plurality of nodes. One of the nodes 14 may be positioned so as to have a plurality of nodes connected downstream therefrom in a branching structure 18. The node 14 may be characterized as an edge node as all signaling between nodes connected downstream therefrom, which may be referred to as inside nodes 20, and nodes connected upstream therefrom, which may be referred to as outside nodes 22, must pass through the edge node 14. The illustrated arrangement may be similar to the branching structure commonly employed in cable systems to facilitate communications between cable modems (CM—inside nodes) and cable modem termination systems (CMTS—edge node 14), which may be referred to as a Hybrid Fiber-Coaxial (HFC) network. A fiber portion of the HFC network/branching structure connects each CMTS to multiple fiber converters located in particular neighborhoods or other geographically spaced areas (converters shown as black boxes). The fiber converters may be configured to covert between optical signaling used on a corresponding fiber links to the edge node 14 to the electrical signaling used on the coax feeders and drops that reach the individual nodes, i.e. the households and CMs of the last mile. The nodes 22 connected upstream of the edge node 14 may be edge nodes also to other nodes connected downstream therefrom or other nodes operable in accordance with the contemplated content/name/information centric networking.

The CCN/NDN technology defines two packet types, an "interest" packet and a "data" packet (while both CCN/NDN use the term "interest", CCN refers to the data packet as a "content object"). The present invention predominately references a request for a piece of content to occur with issuance of an interest and a response thereto, i.e., delivery of the requested piece of content, to occur with issuance of a content object for exemplary non-limiting purposes as the present invention fully contemplates its use and application with other types of protocols, messaging or nomenclatures. An interest may be used to identify the resource, e.g., piece of content, that is being requested, which may be identified by a name that includes provenance. In some cases, the name uniquely (in a global sense) may identify a specific content object, and in other cases it may contain wildcards that indicate that any of a set of content objects that could satisfy the request.

When a client device launches an interest (packet, message, etc.) into the CCN 10, it expects a corresponding content object in response. Notably, the interest does not identify the client (sender) in any way and it may include other fields to refine the request in certain ways. NDN provides several "selectors" for this purpose and CCN includes two additional optional fields: a content object hash and a KeyID. A content object may include the name of the resource, piece of content, etc. included therein. One principal is that a content object is a uniquely named resource chunk. It could be an entire resource, or a small fragment of one, but in either case, it is uniquely identified by the name field. In addition to the name field and the resource itself, the content object contains either a hash or a digital signature that can be used by a recipient to verify provenance. In the case of NDN, each content object may be required to contain a digital signature along with an identifier of the signing key, which allows the packet to be validated by any node in the network. CCN introduces the possibility of using a content object hash, which can be used along with other information to establish provenance as will be described further below.

Structuring names for data objects is an open area of research in the ICN space. In particular, whether names are hierarchical or flat is an area of debate, with pros and cons identified for both approaches. In CCN/NDN names are composed of an arbitrary-length prefix (which is hierarchical) followed by a portion that may or may not be hierarchical. CCN/NDN names commonly resemble a URL, e.g., cablelabs.com/specs/main.html, however the resemblance is largely superficial, because the first element is not intended to be a DNS resolvable name, and a name isn't required to be human-readable. The use of a hierarchical prefix allows for route aggregation in intermediate routers, which is intended to simplify routing. The CCN/NDN architecture may include a trust model for validating packet signatures. Every device that is capable of acting as a source of information (which is practically every networked device) would need one or more certificates to authenticate its content to others, as well as to announce itself to the network as an authoritative source. Developing a trusted means to distribute the certificates, and to establish and convey trust in them is still being researched.

While the purpose of a node (router) in CCN/NDN is largely the same as a router in the world of IP, i.e., moving packets closer to the intended recipient, the functions of a node in CCN/NDN differ considerably from those of an IP router. A CCN/NDN node may consist of a set of faces. The term "face" is used as a more general replacement for "interface", since it not only includes the physical and logical interfaces, but also the applications that reside on the node. To manage packet forwarding, the node maintains three data structures: a Pending Interest Table (PIT); a Forwarding Information Base (FIB) and a Content Store (CS). When an Interest arrives on a particular face, the node first checks the Content Store (CS) to see if a matching content object is already present in cache. If so, it immediately sends a copy of the content object to the face on which the corresponding Interest arrived, optionally without altering the content object in any way. Since addressing is not included in the content object, there is no need to prepend this information, and since each content object is uniquely named and digitally signed by its origin, it makes no difference to the client whether the content object was delivered by an intermediary, or came directly from the origin.

If a matching Data packet does not exist in cache (CS), the node checks to see if a matching entry already exists in the Pending Interest Table (PIT). If a matching entry already exists in the PIT, the node simply adds the face to the existing PIT entry, and discards the Interest. If a match is not found, the node creates a new entry (including the face on which the Interest arrived), and then forwards the Interest out one or more faces based on the content of the FIB (the corollary to the routing table or FIB in an IP router). The FIB may configured to map name prefixes to faces and to use a longest match approach (conceptually similar to IP routing) to find the appropriate FIB entry for a particular interest. As noted above, the FIB entry can identify multiple faces on which the interest could be forwarded. Making decisions about which face to use in this situation is a function of a "strategy" layer within the node. The strategy could deterministically select a face based on history of response times, link cost, or other criteria. Alternatively it could stochastically select a face, perhaps weighting its selection based on these criteria, in order to load-balance traffic to multiple content sources.

The strategy layer is allowed to send the interest out multiple faces. While this "fanning out" of interests is not expected to be used frequently (lest the network be overcome with proliferating interests), it could enable the network to quickly locate the nearest copy of a content object, as well as to move the interest closer to the content origin in the absence of a converged routing topology. When a content object arrives on a particular face, the node checks its PIT to see if any faces have requested the packet. If so, it forwards a copy of the content object to the indicated face(s), deletes the PIT entry, and optionally stores the content object in the content store. Thus, when an interest is launched into the network by a client, it may traverse several intermediate nodes, and potentially be fanned out in different directions. At each intermediate node, a PIT entry is created identifying, for that node, which direction to send the corresponding content object when it arrives. Once a node identifies that it has the content object in its content store, or can respond to the interest itself (via a resident application), the content object follows the breadcrumb trail of PIT entries created by the interest back to the client that initiated it. Every node in the network can check the digital signature of each content object, and discard any invalid packets. In general, the end client would be expected to perform this validation, as would any intermediate node that caches the content object. In CCN, if the content object has a Content Object Hash, each node is required to validate the hash and discard the packet if it does not validate.

One aspect of the CCN is that it can inherently handle "flash-crowd" events very efficiently via the distributed cache and multicast-like distribution system. Since the interests from multiple, simultaneously interested clients become aggregated in PIT entries as they flow toward the content origin, the resulting content object forwarding is automatically performed in a very efficient, multicast-like way with each node replicating the packet to as many faces as needed, but sending only one copy on each face. Further, even in the case that interests are not simultaneous, if each router node in the network caches the popular content object in its content store, the forwarding tree is just as efficient (except in the case of a shared final link, where multiple copies of the content object would be sent). In addition to significantly reducing the network burden of handling these types of events, it massively reduces the burden on the origin server, because in theory, it would only ever need to send one copy of any content object into the network. An additional benefit is that the traditional DoS and DDoS attacks become much less effective (although other CCN/NDN-specific attacks are possible). This in-line caching also allows very efficient recovery from packet loss. While it does require that the client time-out and re-send its interest, the content object does not need to retrieved from the original location, only from node immediately preceding the loss.

Figure 2:
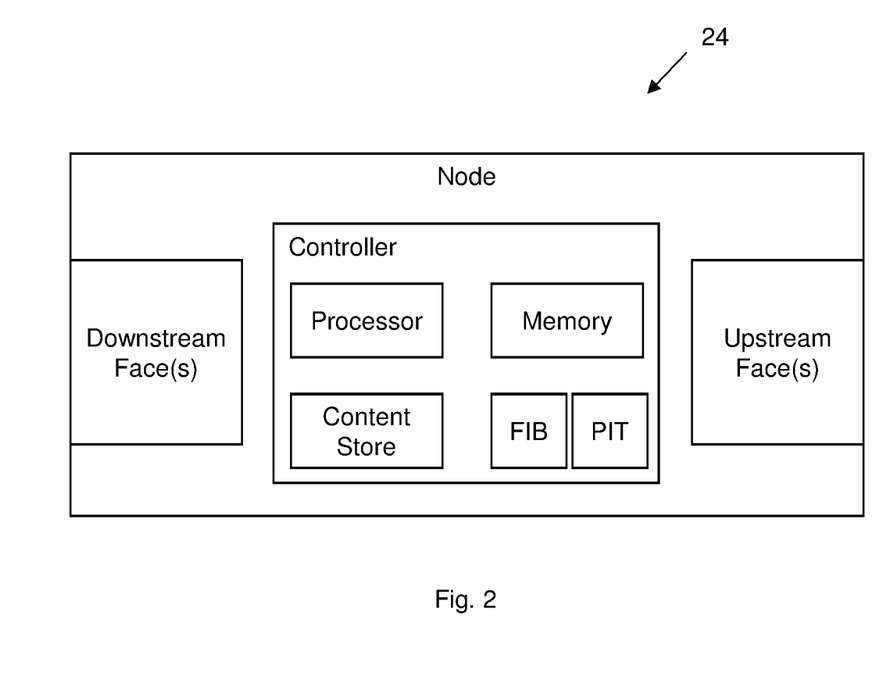
FIG. 2 illustrates a node in accordance with one non-limiting aspect of the present invention.

FIG. 2 illustrates a node 24 in accordance with one non-limiting aspect of the present invention. The node 24 is predominately described as a standalone entity configured to facilitate forwarding, routing or otherwise facilitating signaling between upstream and downstream faces capable of interacting with wired and/or wireless communication mediums. The node is intended to generally refer to any entity distributed in a networked environment capable of operating in accordance with the described architectures, protocols and messaging associated with content/name/information centric networking, e.g., capable of facilitating non-IP-based communications (although in some circumstances the node 24 may be configured to also support optionally IP-based indications). The node 24 may include a controller for controlling the operation thereof being provided with a processor configured to facilitate executing non-transitory instructions stored within a non-transitory computer-readable medium, such as to facilitate preemptively caching content objects or other files, messages, data, information, etc. as contemplated by the present invention. A content store, a FIB and a PIT are shown for exemplary purposes as being separate from the memory in order to pictorially note the operations and processes described above and associated therewith.

Figure 3:
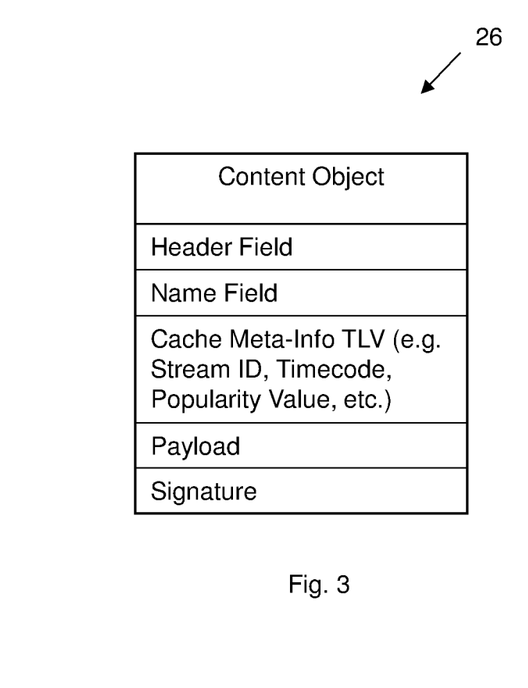
FIG. 3 illustrates a content object in accordance with one non-limiting aspect of the present invention.

FIG. 3 illustrates a content object 26 in accordance with one non-limiting aspect of the present invention. The content object 26 may be stored within the content store in order to facilitate the preemptive caching contemplated herein. The content object 28 may be characterized as a message type utilized within the CCN 10 to facilitate delivering a piece of content to a requester in response to a corresponding interest, i.e., the interest may be a request message and the related content object 26 may be a corresponding response message. Forwarding of the content object 26 may be facilitated with a header having fixed and/or optional fields as defined according to certain protocols to facilitate version identification and other communication parameters. The name associated with the piece of content included within the content object may be identified within a name field as a globally unique name, i.e., unique across all networks, or locally unique or unique over the communication range of the CCN. A cache meta-info type-length-value (TLV) field may include a stream identity (ID), a timecode, a popularity value and/or additional information regarding the content object and/or the piece of content included within a payload, which as described below in more detail may be utilized in accordance with the present invention to facilitate preemptive caching. The content object may include a signature that a recipient can use to verify provenance of the content object and/or the piece of content therein, such as with the use of certificates or other digital authorization techniques.

Figure 4:
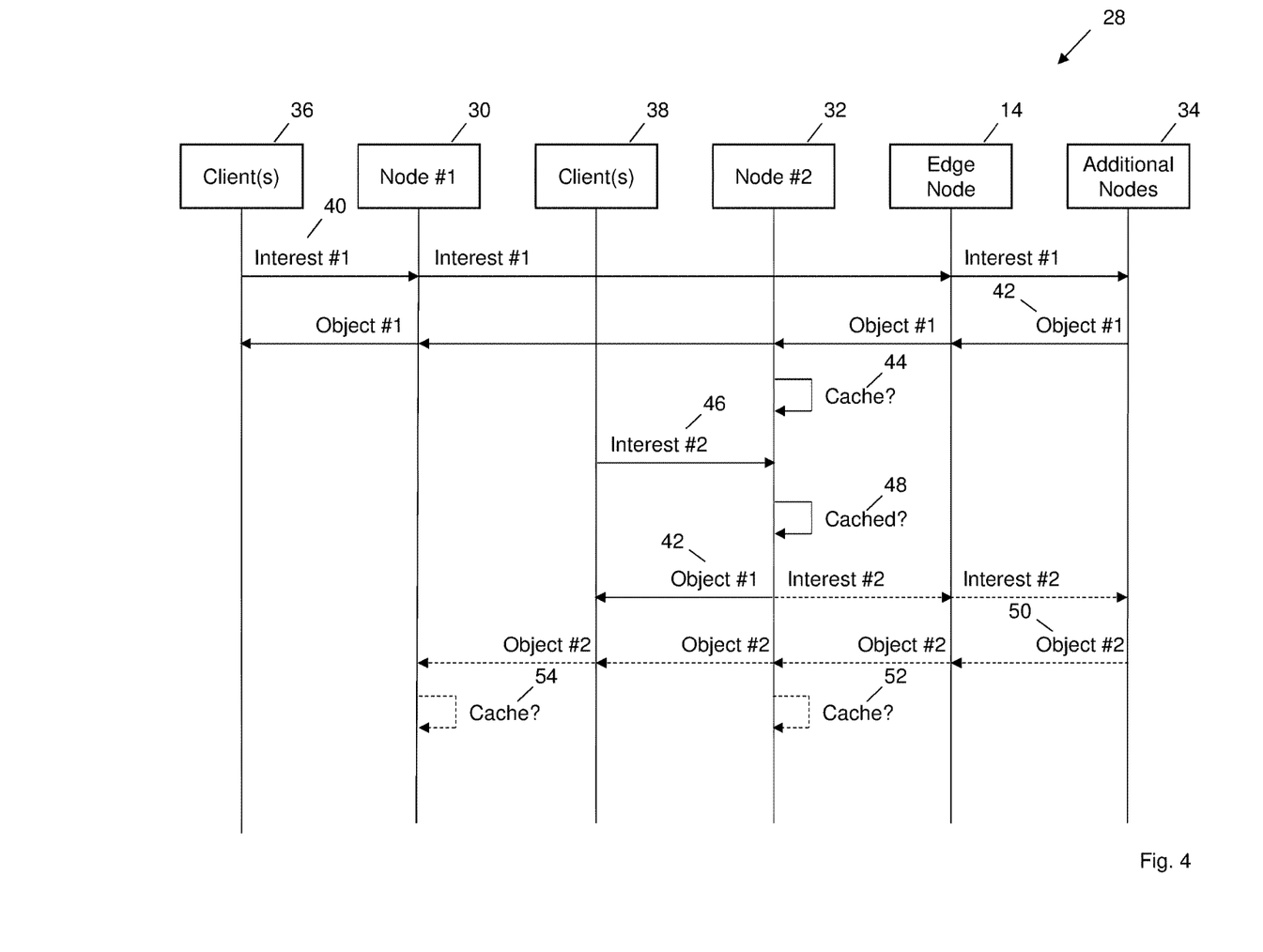
FIG. 4 illustrates a messaging diagram for preemptive caching in accordance with one non-limiting aspect of the present invention.

FIG. 4 illustrates a messaging diagram 28 associated with facilitating preemptive caching in accordance with one non-limiting aspect of the present invention. The diagram illustrates an exemplary scenario where first and second nodes 30, 32 are connected downstream of the edge node 14 within the branching structure 18 such that communications between the first and second nodes 30, 32 and nodes 34 upstream or outside of the edge node 14 pass through the edge node 14. The branching structure 18 is constructed such that upstream communications, such as interests or other messages traveling from the first and second nodes 30, 32 to the edge node 14, are received only at the edge node 14, i.e., the other nodes 20 downstream of the edge node 14 do not receive upstream traveling messages from other downstream connected nodes 20. The branching structure 18 is also constructed such that downstream communications, such as content objects or other messages traveling from the edge node 14 to the first and second nodes 30, 32, are received at each of the first and second nodes 30, 32 as well as each one of the other downstream connected nodes 20, i.e., all nodes 20 downstream of the edge node 14 receive downstream traveling messages due to the branching structure 18 including being configured to facilitate copying signaling to all downstream connected devices 20. While the present invention fully contemplates its use and application in non-branching structures, its use within the noted branching structure 18 is believed to be particularly beneficial due to each downstream node 20 commonly receiving content objects traveling downstream from the edge node 14.

The messaging diagram 30 illustrates an exemplary scenario where the first and second nodes 30, 32 are configured to facilitate forwarding upstream and downstream messages for one or more clients 36, 38 connected thereto. The first client 36 connected to the first node 30 may transmit a first interest 40 to request a first piece of content, e.g., user of the client 36 may request a file downloaded from a webpage, request content streaming from a television service provider, automatically schedule a file download or software update, etc. The first interest 40 may include a first name for the first piece of content and be transmitted to the first node 30 without including addressing or other IP-related information, e.g., the first client 36 may forward the interest to a first face of the first node 30. The first node 30 may process the first interest 40, e.g., update its PIT and assess its FIB, to facilitate subsequent forwarding of the interest 40 to another upstream node, which in the illustrated branching structure is the edge node 14. The messaging diagram 30 includes arrowheads to indicate receipt of corresponding messages, which with respect to the first interest 40 illustrates the first interest 14 traveling from the first node 30 to the edge node 14 without being received at the second node 32 or any additional downstream connected nodes 20. The edge node 14 may process the first interest, e.g., update its PIT and assess its FIB, to facilitate subsequent forwarding of the first interest 40 to another upstream node 34 associated with the CCN 10. (It is assumed at this stage that the first and edge nodes 30, 34 have not preemptively cached the first piece of content or a content object having the first piece of content as contemplated herein.)

One of the additional, upstream nodes 34 may follow a "breadcrumb" trail associated with the first interest 40 following forwarding from the edge node 14 to responsively transmit a first content object 42 to the edge node 14 in satisfaction of the first interest 40. The first content object 42 may include the first piece of content requested by the first client 36 in the first interest 40, i.e., the name and/or signature included within the first content object 42 may be verified or assessed as matching with the name and/or signature within the first interest 40. The edge node 14 may forward the first content object 42 over the branching structure 18 for receipt at the first and second nodes 30, 32 and any additional nodes 20 connected downstream thereof. The first node 30 may process the received first content object 42 to determine an entry within the PIT whereupon the first node 30 may automatically forward the first content object 42 to the requesting client 36 according to a face cross-referenced therewith within the PIT. (It is assumed at this stage that the first node 30 has no further interest in the first content object 42 and as a result discards it and/or erases or removes corresponding entries from the PIT.) The second node 32, optionally simultaneously with the processing being performed at the first node 30, may similarly process the first content object 42 to determine whether the corresponding entry exists within its PIT. Assuming no existing entry exists within the PIT, the second node 32 may perform a cacheability assessment 44 as contemplated by one non-limiting aspect of the present invention to facilitate determining whether caching of the first content object 42 within a content store of the second node 32 is desirable.

The cacheability assessment 44 may correspond with the second node 32 determining whether any connected clients or clients otherwise associated therewith 38 are likely to be interested in the first content object 42 and/or the first piece of content included therein. The cacheability assessment 44 may include the second node 32 evaluating the first content object 42, including the parameters included within the meta-info TLV field, to determine whether the corresponding cacheability assessment/value exceeds a threshold or other standard for deciding whether to cache the first content object 42. One cacheability assessment 44 may be based on whether one or more clients 38 of the second node 32 are streaming content similar to the first piece of content, e.g., the first piece of content may be associated with a movie, television program or other arranged sequence whereby a plurality of pieces of content are required to be individually transmitted to a requester in order to access an entirety of the content. A manifest or other roadmap may be transmitted to the requesting client to facilitate generating corresponding interests required to individually obtain the content objects necessary to reconstruct an entirety of the content. The cacheability assessment 44 may determine the threshold for caching to be surpassed, i.e., caching to be desirable, when a stream ID included within the first content object 42 matches with a stream ID currently active at the second node 32, which may occur when a client 38 of the second node 32 is watching the same television program, movie, etc. or otherwise issuing interests according to the same or similar manifest as the client 36 of the first node 30.

The stream ID based cacheability assessment may further include assessing a timecode included within the first content object 42 to determine whether the piece of content included therein is likely to be of interest to the client 38 of the second node 32. In the event the client 38 is watching a television program having the same stream ID as the stream ID included within the first content object 42, for example, the matching stream ID assessment may be further refined to ensure only content objects that have not already been provided to the second node 32 are cached. The timecode included within the first content object 42 may correspondingly be compared to a timecode for a content object most recently received at the second node 32 for the matching stream ID to determine whether the first content object 42 would likely be of interest, e.g., the interest threshold may be surpassed if the timecode of the first content object 42 occurs after the most recent content object of the matching stream ID, i.e., indicating the second node 32 has not yet received the first piece of content, and to be unsurpassed if the timecode occurs before the most recent content object of the matching stream ID, i.e., indicating the second node 32 has already received the first piece of content. Optionally, the stream ID based cacheability assessment may include further analysis, such as reviewing additional parameters included within the meta-info TLV to assess output, image, video, etc. compatibility of the first piece of content with the capability of the requesting client 38.

The cacheability assessment 44 may also correspond with the second node 32 performing any number of other analyses of the first content object 42 and its likelihood to be of interest to its clients 38. One such analysis may be based on a buffer or size of the content store of the first node 32 whereby a continuous assessment is made of received content objects requested by clients other than those of the second node 32 to ensure the buffer is kept at desired operational levels, e.g., in absence of ongoing streaming at the second node 32 or some other priority set for content objects already stored in the content store of the second node 32, a popularity evaluation may be performed to automatically keep storing more popular content objects within the content store of the second node 32. The popularity evaluation may include assessing a popularity value included within the first content object 42 to the popularity value of other content objects within the content store such that the first content object 42 may be stored in place of existing content objects when it has a popularity value greater than those existing in the content store. Another analysis may be based on other values or parameters included within the first content object 42 such that an interest score may be generated for each content object included within the content store. Optionally, regardless of other priority values were previously assigned to the stored content objects, the lowest scored content object may be replaced with the first content object 42 when the first content object 42 has a greater interest score.

The cacheability assessment 44 is generally intended to facilitate preemptively caching content objects prior to the matching piece of content being requested by a client of the corresponding node, i.e., after a client of another node issues an interest, and such that each of the nodes receiving the responsive content object is able to make a preemptive caching decision. The number of variables and values utilized when generating the cacheability assessment 44 may be more or less of the above-described parameters. One such assessment may include eliminating reliance on the timecode or stream ID and instead more simply including a tag or flag within content objects to indicate whether the corresponding piece of content is associated with live content (or sports, news, etc.) on the belief that live or correspondingly tagged content will be requested sooner than non-live content or other content lacking suitable tagging. Such tag-based caching may optionally assume sufficient storage space within the content store or that storage space has not already been allocated to active streams, e.g., it may be desirable to prioritize active streams over inactive streams or expected activity. One non-limiting aspect of the cacheability assessment 44 contemplated herein presumes the nodes other than the requesting nodes lack prior knowledge or awareness that the first content object 42 has been requested, i.e., the second node 32 receives the first content object 42 as an unsolicited message. This presumption may require the second node 32 to perform the cacheability assessment 44 or other process associated with preemptive caching without prior warning or knowledge of the incoming content object.

In the event manifests or other descriptors are available to indicate sequences or arrangements of content, the second node 32 may be able to presume additional content objects related to the first content object 42 are forthcoming, e.g., if the first content object 42 is early within a manifest of a corresponding content stream, it may be presumed that the first client 36 will continue to issue related interests and correspondingly receive additional content objects for the later scheduled portions of the manifest. The second node 32, due to the branching structure, would be unaware of the additional interests when transmitted from the first client 36 but would receive the corresponding content objects such that the second node 32 can plan for receipt of the additional content objects based on the manifest or the stream ID included within the first content object 42. The second node 32 can thereafter set parameters within its PIT to facilitate automatically caching and/or forwarding the content objects expected to be received according to the manifest and prior to actually receiving the corresponding content objects. Unlike the cacheability assessment 44 performed based on information included within the first content object 42, i.e., after receiving the first content object, the PIT population may be performed prior to receipt of expected content objects based on the manifest, which may be beneficial in ameliorating or eliminating a need to perform the cacheability assessment when the related content objects are eventually received.

After the caching decision 44 is made, the second node 32 may maintain a state of awareness waiting for and processing additional interest request from its clients 38. The second node 32 may be configured to process multiple interests and content objects to facilitate forwarding messages for any number of downstream connected clients 38 and/or other downstream connected nodes. One of the second node clients may transmit a second interest 46 to request the first piece of content identified in the first interest 40 and transmitted within the first content object 42. The second node 32 may perform a cache evaluation 48 to determine whether a matching content object has already been stored within the content store, i.e., whether the second node 32 has the first content object 42 stored or another content object having the first piece of content. The cache evaluation 48 may be performed based on cross-referencing the name included within the second interest 46 to the names of the content objects included within the content store or through some other lookup process sufficient to relate the name specified in the second interest 46 to the names of stored content objects. In the event the first content object 42 was stored in the content store, the second node 32 may automatically forward the first content object 42 to the requesting client 38 without communicating or otherwise forwarding the second interest 46 further upstream (shown with solid line). The second node may thereafter continue to store the first content object 42 within the content store, such as if an additional cacheability assessment performed thereafter (not shown) determines the first content object 42 to continue surpassing the caching threshold, or the first content object 42 may be discarded automatically or upon the additional cacheability assessment being insufficient for further caching.

The second node 32 may forward the second interest to the edge node 14 in the event the cache evaluation 48 fails to identify a matching content object or matching piece of content, such as in the event the caching decision 44 was against storing the first content object 42. A similar process to that described above with respect to the first node 30 receiving the first interest 40 may be similarly performed whereby the edge node 14 forwards the second interest 46 over the CCN 10 to generate responses from the additional nodes 34 (shown in dashed lines). The corresponding second content object 50 may be received at the edge node 14 and forwarded downstream to each of the first and second nodes 30, 32 and the other inside nodes 20. The second node 32 may responsively forward the second content object 50 according to its PIT to the requesting client 38, optionally thereafter performing an additional cacheability assessment 52 to determine whether the second content object 50 should be stored for additional clients 38. The first node 30 may responsively perform its own cacheability assessment 54 to determine whether any of its clients 36 are likely to be interested in the second content object 50. The messaging diagram illustrates an exemplary scenario where the first and second interest 40, 46 and the first and second content objects 42, 50 are associated with the same first piece of content, i.e., different messages that may be generated by different clients 36, 38 and forwarded by different nodes 30, 32 to facilitate obtaining the first piece of content according to the request and response protocol of the CCN 10.

The messaging diagram 28 also illustrates an exemplary scenario where the upstream, interests 40, 46 and messages transmitted as part of the request and response protocol are unviewed or otherwise unreceived at the other nodes 20 or clients included within the branching structure 18 downstream of the edge node 14 and where the downstream content objects 42, 50 or other response messages generated in response thereto are received at each of the nodes 20 included within the branching structure 18 downstream of the edge node 14. The content object received at the node of the client initiating the corresponding interest request may be considered as a solicited message, i.e. a message requested by that node/client, whereas the additional content objects received at the other nodes may be characterized as unsolicited messages, i.e. messages received due to activity at other nodes other than itself. One non-limiting aspect of the present invention contemplates a beneficial process for preemptively caching content when unsolicited content objects or other response messages are available to the plurality of nodes 20, particularly when the nodes are located at the "last mile" or otherwise the last node/routing element closest to the clients or other ultimate destination. The close proximity may be beneficial in distributing content object caching across more nodes/devices while also reducing network traffic and response time compared to more centralized caching processes, e.g., core-caching performed at the edge node 14 or other upstream second node. The present invention is not necessary so limited and fully contemplates performing similar caching at virtually any location within the CCN 10, including at the edge node 14 or other node positioned further upstream or at the head of a branching structure.

Figure 5:
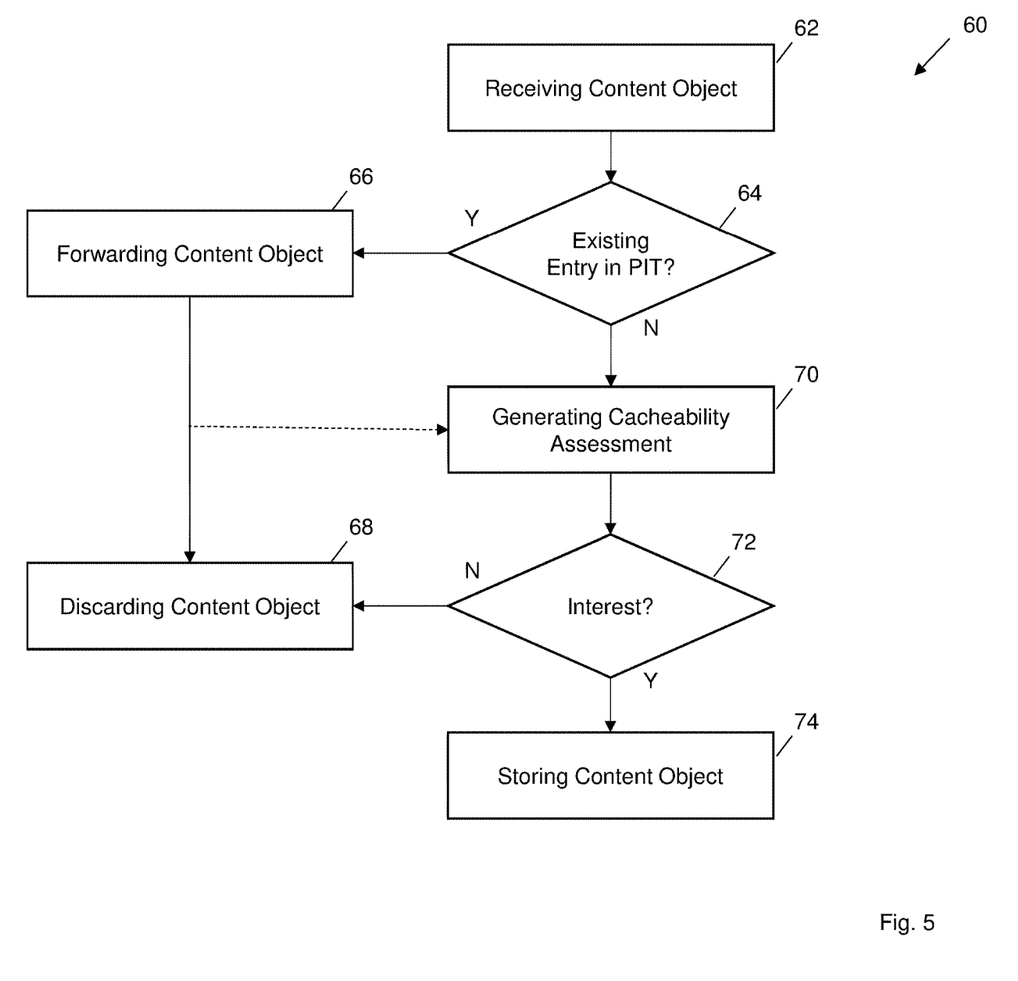
FIG. 5 illustrates a flowchart of a method for preemptive caching in accordance with one non-limiting aspect of the present invention.

FIG. 5 illustrates a flowchart 60 of a method for preemptive caching within a CCN in accordance with one non-limiting aspect of the present invention. The operations and processes associated with the method may be facilitated with the non-transitory instructions stored within the controller of each node and/or through a remote controller or other device operating independently of the nodes having capabilities sufficient or capable of monitoring and providing the corresponding instructions/commands to the nodes needed to facilitate executing the operations associated therewith. While not necessary limited to the above-described branching structure whereby multiple nodes receive unsolicited content objects or other response messages communicated in the CCN according to the request and response protocol, the method is predominately set forth with respect to the processing and other operations undertaken at inside nodes included in such a branching structure when commonly receiving solicited and unsolicited content objects. Block 62 relates to a node receiving a content object transmitted over the CCN according to the request and response protocol. Block 64 relates to the node assessing whether the content object is associated with an existing entry in the PIT, i.e., whether the node should automatically forward the content object to the face noted in the PIT/FIB or whether additional processing should be performed to determine use of the content object.

Block 66 relates to the content object including an entry with the PIT and the node automatically forwarding the content object to the requesting client. Block 68 relates to the node thereafter discarding or deleting the content object from memory, optionally along with corresponding entries within the PIT/FIB. Block 70 relates to generating and cacheability assessment for the content object when the PIT lacks a corresponding entry, i.e., when existing instructions regarding handling of the content object are unavailable, or optionally when the node/controller includes a default or is otherwise operationally set to perform an cacheability assessment for all content objects, i.e., regardless of whether the content object was solicited or unsolicited (shown in dashed line). Block 72 relates to determining whether the cacheability assessment generates a result sufficient to exceed the interest threshold or other measure regarding caching the content object, such as in the above-described manner. Block 68 relates to discarding the content object and optionally additional information related thereto in the event the cacheability assessment is insufficient. Block 74 relates to storing the content object in the event the cacheability assessment is sufficient, which may include adding information within the PIT/FIB to ensure the node automatically retrieves the content object for forwarding to a requesting client when a subsequent interest is received or when otherwise undertaking activities to facilitate forwarding the content object from its content store, such as by notifying neighboring nodes or other devices of its availability therefrom.

As supported above, one non-limiting aspect of the present invention contemplates a signaling method and cache behavior that allow a gateway device to preemptively cache content objects requested by another user in anticipation of a request by a subtending user, thus eliminating the need for time alignment of requests. One aspect of the invention includes a field being added to content objects that provides information that can be used by an application-aware gateway device connected to the shared-medium. The information identifies the content objects of a stream via a unique stream ID and further provides a timecode in each content object that indicates where in the playback timeline of the content object sits. This information is inserted into each content object of a stream by the origin server. A set of gateway devices sharing a communications medium each independently examine the stream IDs of content objects that are being requested by their subtending client devices, and each independently maintain a table listing the stream IDs being actively requested as well as the current timecode being requested. In the case that content objects are received by a gateway, on the shared medium, with stream IDs that match those in the active list, and that have a timecode representing a time in advance of the current timecode being requested, the gateway will preemptively cache those content objects in absence of a pending request (i.e. a matching entry in the Pending Interest Table). In other words, these preemptively cached content objects were requested by a first user that is watching the stream, and they are being opportunistically cached by the gateway of a second user that is watching the same stream, but with some time delay. Thus, the second user will end up having the stream cached locally, and will not burden the shared medium with retransmitting the content.

Additional fields could be added to influence the preemptive caching behavior of a gateway. For example, streams could be tagged with a relative popularity score that could be used by the gateway to opportunistically cache a stream that is not currently being watched by a user, but due to its high popularity score, stands a good chance of being watched. Gateways would preemptively cache content objects based on examining the stream ID and the timecode. If a gateway determines, based on this information, and based on seeing the stream IDs and timecodes received for content objects explicitly requested for by a subtending user (i.e. content objects for which a matching entry in the exists in the PIT), that the unsolicited content object is associated with an actively viewed stream. As an enhancement, the gateway could examine the timecode of an unsolicited packet, compare it with the currently requested timecode for the stream, examine available cache memory, and determine whether it would be likely that this unsolicited object would remain in cache until the projected time that the user would request for it, and if so, the gateway would opportunistically cache the object. Thus, the gateway with limited caching memory would be prevented from caching content that is too far in the future, and would likely be overwritten before it would be requested by the subtending client.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-transitory computer-readable medium having a plurality of non-transitory instructions executable with a processor and sufficient to facilitate preemptively caching pieces of content for a first node of a plurality of nodes included within a content-centric network (CCN), each of the pieces of content available for transmission over the CCN being individually and uniquely associated with a unique name and being communicable over the CCN according to a request and response protocol, the request and response protocol characterized by the use of an interest to request a piece of the content and the use of a content object to responsively deliver a piece of the content whereby the piece of content associated with each interest and content object is individually differentiated according to the name associated therewith, the non-transitory instructions being sufficient for:

determining a first content object being communicated over the CCN in response to a first interest transmitted from a second node of the plurality of nodes, the second node transmitting the first interest in response to a first client connected thereto generating the first interest to request delivery over the CCN of a first piece of content associated with a first name;

determining a first cacheability assessment for the first content object, the first cacheability assessment representing a likelihood of a second client connected to the first node being interested in the first piece of content; and     preemptively caching the first content object in a first content store of the first node when the first cacheability assessment meets a threshold such that the first content object is stored in the first content store prior to the second client requesting the first piece of content.

2. The non-transitory computer-readable medium of claim 1 further comprising non-transitory instructions sufficient for:

performing the first cacheability assessment without determining whether a pending interest table (PIT) of the first node includes a PIT entry corresponding with the first content object and without determining whether a forwarding information base (FIB) of the first node includes a FIB entry corresponding with the first content object;

determining a second interest received at the first node, the second interest being transmitted to the first node from the second client to request the first piece of content;

retrieving the first content object from the first content store; and     transmitting the first content object retrieved from the first content store to the second client in satisfaction of the second interest.

3. The non-transitory computer-readable medium of claim 1 further comprising non-transitory instructions sufficient for preemptively caching the first content object within the first content store without the first node receiving or processing the first interest.

4. The non-transitory computer-readable medium of claim 1 further comprising non-transitory instructions sufficient for preemptively caching the first content object within the first content store without the first node soliciting the first content object such that the first content object is received at the first node in an unsolicited manner.

5. The non-transitory computer-readable medium of claim 1 further comprising non-transitory instructions sufficient for discarding the first content object when the first cacheability assessment fails to meet the threshold such that the first node processes the first content object without storing the first content object within the first content store.

6. The non-transitory computer-readable medium of claim 1 further comprising non-transitory instructions sufficient for:

determining a plurality of stream identifiers (IDs) for content streams being streamed to the first node proximate in time to determining the first cacheability assessment, each content stream being associated with a plurality of the pieces of content arranged according to time-coded sequences; and     determining the first cacheability assessment fails to meet the threshold when a first stream ID included within the first content object fails to match with at least one of the plurality of stream IDs.

7. The non-transitory computer-readable medium of claim 6 further comprising non-transitory instructions sufficient for:

determining the first stream ID to match with a second stream ID of the plurality of stream IDs;

determining a first timecode included within the first content object, the first timecode indicating relative positioning of the first piece of content according to the time-coded sequence of the content stream associated with the second stream ID;

determining a second timecode for a one of the plurality of the pieces of content most recently received at the first node for the content stream associated with the second stream ID, the second timecode indicating relative positioning of the most recently received piece of content according to the time-coded sequence of the content stream associated with the second stream ID; and     determining the first cacheability assessment meets the threshold when the first stream ID matches with the second stream ID and the second timecode occurs prior to the first timecode.

8. The non-transitory computer-readable medium of claim 7 further comprising non-transitory instructions sufficient for determining the first cacheability assessment fails to meet the threshold when the first stream ID matches with the second stream ID and the second timecode occurs after the first timecode.

9. The non-transitory computer-readable medium of claim 1 further comprising non-transitory instructions sufficient for determining the first cacheability assessment meets the threshold when the first cacheability assessment is greater than a second cacheability assessment associated with a second content object stored within the first content store at a time when the first cacheability assessment is determined.

10. The non-transitory computer-readable medium of claim 9 further comprising non-transitory instructions sufficient for determining the first and second assessments according to a popularity evaluation, the popularity evaluation comparing a first popularity value included within the first content object to a second popularity value included within the second content object whereby the first cacheability assessment is determined to be greater than the second cacheability assessment when the first popularity value is greater than the second popularity value and the first cacheability assessment is determined to be less than the second cacheability assessment when the first popularity value is less than the second popularity value.

11. A method for facilitating preemptive caching within a content-centric network (CCN) comprising:

receiving at a first node of the CCN a content object transmitted from a second node of the CCN, the content object including a piece of content requested with an interest transmitted from a first client connected to a third node;

determining whether the piece of content is likely to be of interest to a second client connected to the first node; and     preemptively caching the content object in a content store of the first node if the piece of content is likely to be of interest to the second client such that the piece of content is cached within the content store after the first client transmits the interest to the third node and prior to the second client subsequently requesting the piece of content.

12. The method claim 11 further comprising determining the piece of content is likely to be of interest to the second client when the content object includes:
   a stream identifier (ID) matching with a stream ID of a content stream active at the first node when the first content object is received; and
   a timecode indicating the content object corresponds with part of the content stream that has not yet been transmitted to the first node.

13. The method claim 12 further comprising determining the piece of content is likely to be of interest to the second client when:
   the stream ID fails to match with the stream ID of the content stream active at the first node;
   a field included with the first content object indicates the content object to have a popularity score greater than another content object stored in the content store for another content stream inactive at the first node;
   determining the content stream to be active at the first node when being contemporaneously streamed therefrom to the second client or another client connect thereto; and
   determining the another content steam to be inactive at the first node when not contemporaneously being streamed to the second client or the another client connected thereto.

14. The method claim 11 further comprising preemptively caching the content object in the content store without the first node receiving or otherwise processing the interest after the interest is transmitted from the third node over the CCN for receipt at the second node.

15. A content-centric network (CCN) with preemptive caching comprising:
   a plurality of CCN nodes arranged in a branching structure, the branching structure having an edge CCN node of the plurality of CCN nodes positioned upstream of at least one or more downstream CCN nodes of the plurality of CCN nodes such that downstream traveling CCN content objects forwarded from the edge CCN node are received at each of the downstream CCN nodes and upstream traveling CCN interests forwarded from the downstream CCN nodes are received at the edge CCN node without being received at any other of the downstream CCN nodes; and
   a controller operable with at least a first node of the downstream CCN nodes to facilitate preemptively caching unsolicited CCN content objects within a content store of the first node, the unsolicited CCN content objects being downstream traveling CCN content objects forwarded from the edge CCN node in response to one of the downstream CCN nodes other than the first node forwarding a corresponding CCN interest upstream to the edge CCN node.

16. The CCN network of claim 15 wherein the controller corresponds with a processor of the first node executing a plurality of non-transitory instructions stored within a non-transitory computer-readable medium of the first node, the non-transitory instructions being sufficient for:
   determining whether a first piece of content included within a first CCN content object received at the first node is likely to be of interest to a client, the first CCN content object being one of the unsolicited CCN content objects forwarded from the edge CCN node to each of the downstream CCN nodes;
   preemptively caching the first content object in a first content store of the first node if the first piece of content is likely to be of interest to the client.

17. The CCN network of claim 16 wherein the non-transitory instructions are sufficient for determining the first piece of content is likely to be of interest to the client when the first content object includes:
   a stream identifier (ID) matching with a content stream active at the first node; and
   a timecode indicating the first content object corresponds with part of the content stream that has not yet been transmitted to the first node.

18. The method of claim 11 further comprising discarding the content object from the first node if the piece of content is unlikely to be of interest to the second client.

19. The method of claim 18 further comprising determining the piece of content to likely be of interest to the second client with execution of a manifest analysis performed prior to receipt of the content object at the first node, the manifest analysis determining the piece of content likely to be of interest to the second client when the piece of content is identified in a manifest utilized at the second client to facilitate streaming content thereto over the CCN.

20. The method of claim 19 further comprising, when the manifest analysis fails to determine the piece of content to likely be of interest to the second client, thereafter determining the piece of content to likely be of interest to the second client with execution of a cacheability analysis performed upon receipt of the content object at the first node when the first node fails to already include a pending interest table (PIT) entry in a PIT table for the content object, the cacheability analysis comparing data included with the content object to a threshold to determine whether the piece of content is likely to be of interest to the client.

* * * * *